(12) United States Patent
Pacella et al.

(10) Patent No.: US 6,328,359 B1
(45) Date of Patent: Dec. 11, 2001

(54) DOOR INTRUSION BEAM

(75) Inventors: John P. Pacella, Rochester Hills; Joseph E. Mrozowski, Clarkston; Earl E. Kansier, White Lake, all of MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/624,121

(22) Filed: Jul. 24, 2000

(51) Int. Cl.$^7$ .................................................. B60R 19/42
(52) U.S. Cl. .................................... 293/128; 296/146.6
(58) Field of Search .................. 293/128, 126; 296/146.6

(56) References Cited

U.S. PATENT DOCUMENTS

| | | | |
|---|---|---|---|
| 3,290,082 | * 12/1966 | Fritsch | 293/128 |
| 3,359,030 | * 12/1967 | Newman | 296/128 |
| 3,388,523 | * 6/1968 | Evans | 293/128 X |
| 3,451,709 | * 6/1969 | Swauger | 293/128 |
| 3,506,294 | * 4/1970 | Newman | 293/128 |
| 3,517,473 | * 6/1970 | Kistner et al. | 293/128 X |
| 3,572,799 | * 3/1971 | Truesdell | 293/128 |
| 3,894,763 | * 7/1975 | Barenyi | 293/128 X |
| 3,897,967 | * 8/1975 | Barenyi | 293/128 X |
| 4,066,285 | * 1/1978 | Hall et al. | 293/128 X |
| 4,290,235 | 9/1981 | Jahnle et al. . | |
| 4,307,911 | 12/1981 | Pavlik . | |
| 4,353,584 | * 10/1982 | Lovett | 293/128 X |
| 4,613,178 | * 9/1986 | Fujita | 293/128 |
| 4,948,637 | * 8/1990 | Kessler | 293/128 X |
| 5,188,408 | * 2/1993 | Berdan et al. | 293/128 X |
| 5,272,841 | 12/1993 | Freeman et al. . | |
| 5,277,470 | 1/1994 | Freeman et al. . | |
| 5,288,530 | * 2/1994 | Maki | 293/128 X |
| 5,639,522 | * 6/1997 | Maki et al. | 293/128 X |
| 6,203,095 | * 3/2001 | Peterson | 293/128 X |

FOREIGN PATENT DOCUMENTS

0030417 * 2/1986 (JP) ........................................ 293/128

* cited by examiner

*Primary Examiner*—Joseph D. Pape
(74) *Attorney, Agent, or Firm*—Harness, Dickey & Pierce, P.L.C.

(57) ABSTRACT

A door assembly for a vehicle. The door assembly includes a frame structure and an intrusion structure. The frame structure includes an inner panel member and an outer panel member. The intrusion structure has an impact absorbing portion and is coupled to the frame structure such that the intrusion structure abuts an exterior surface of the outer panel member. A method for fabricating a vehicle door assembly is also provided.

22 Claims, 4 Drawing Sheets

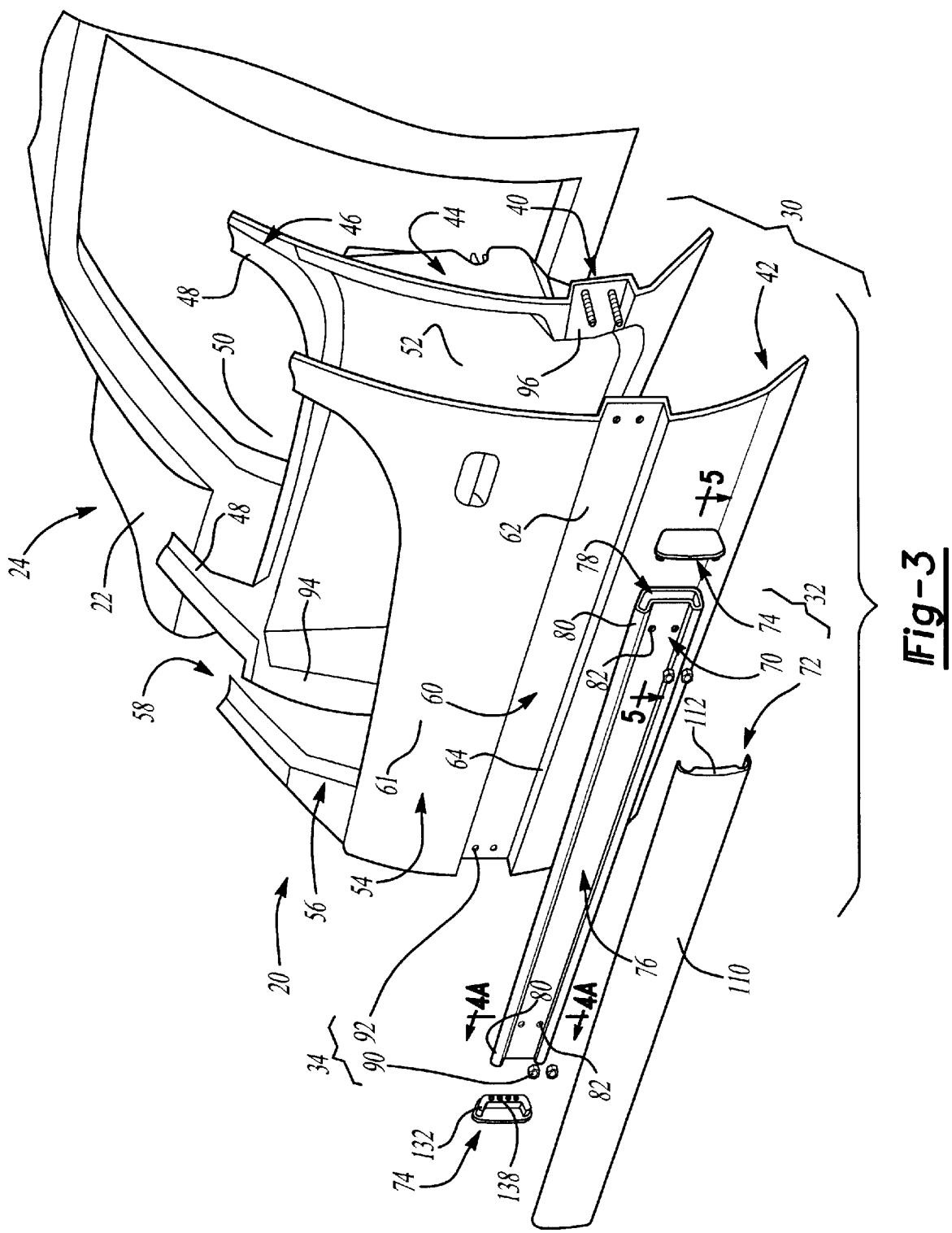

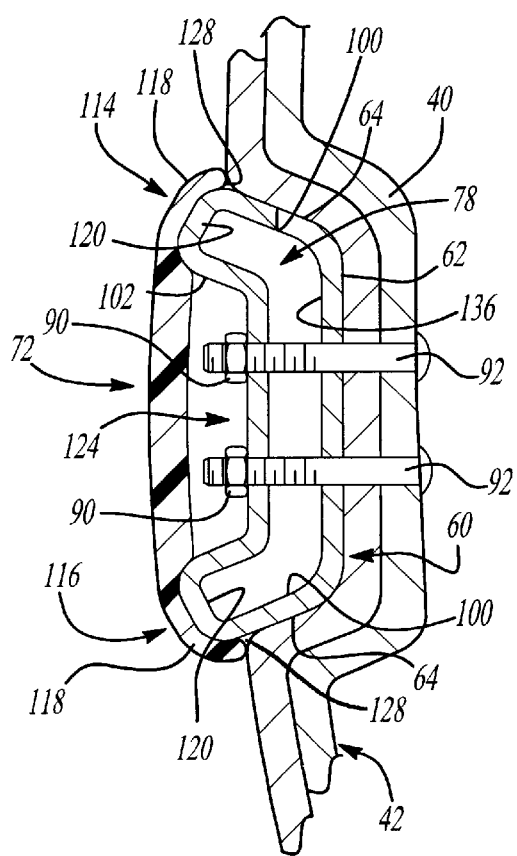
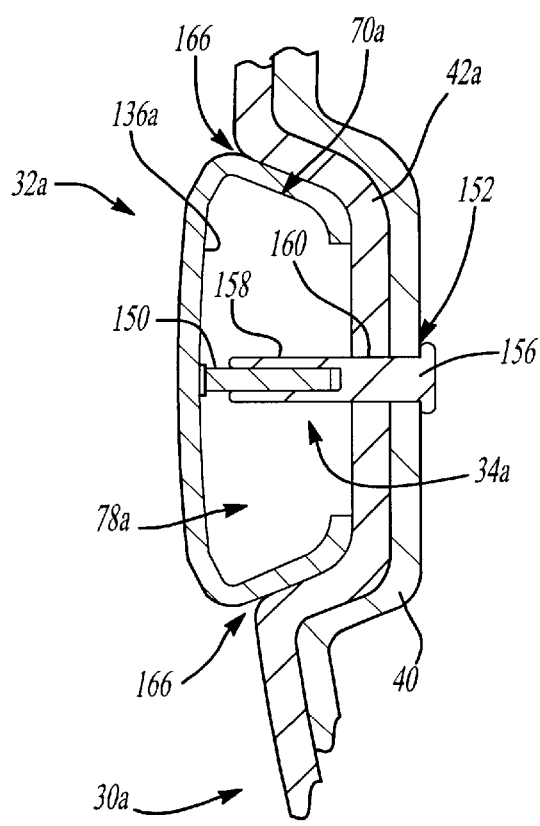
Fig-4A
Fig-4B

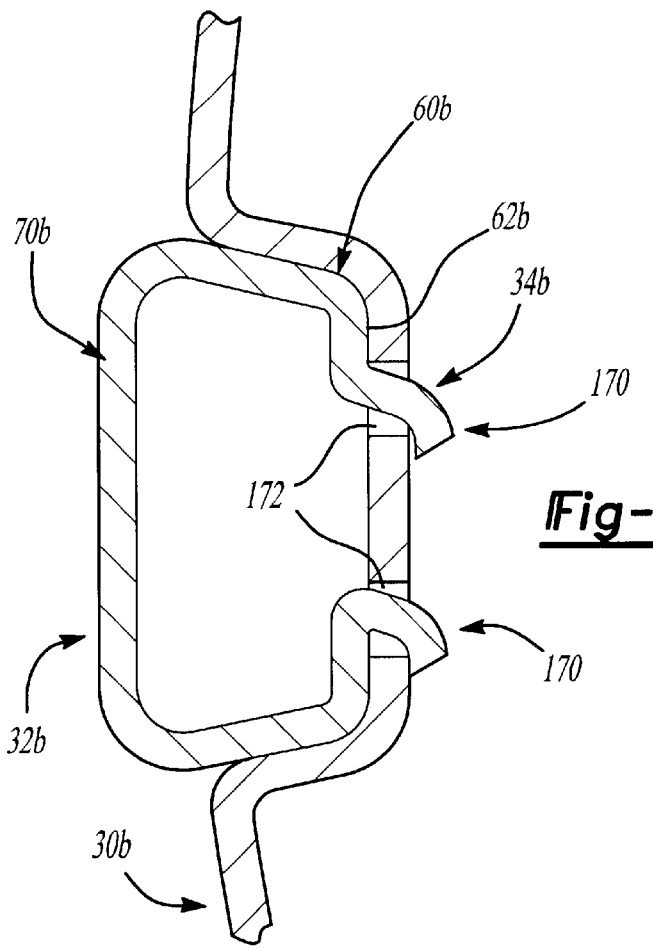
_Fig-4C_
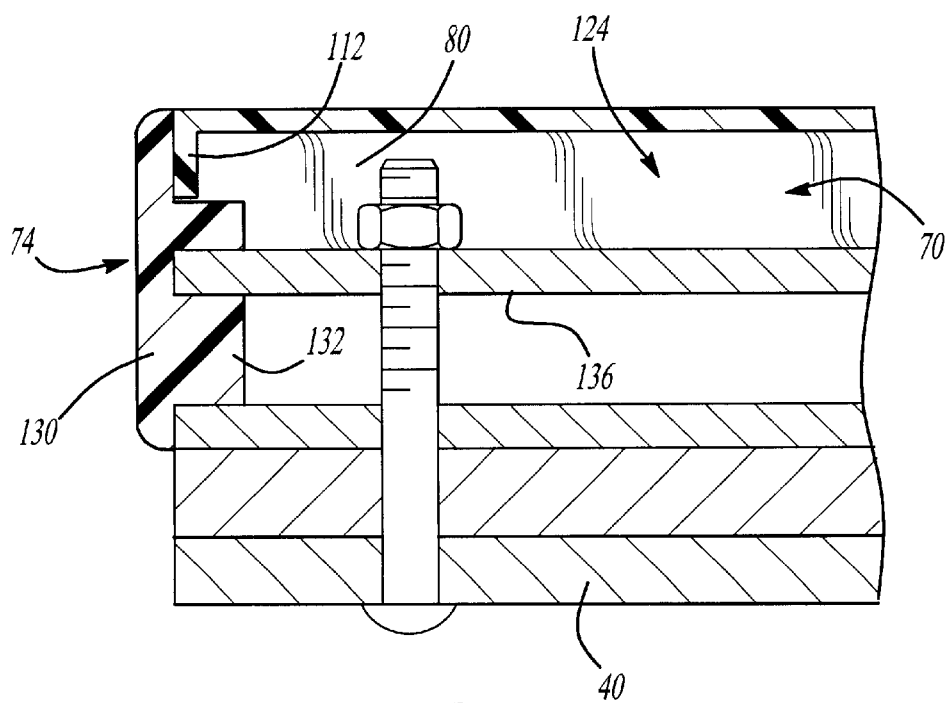
_Fig-5_

DOOR INTRUSION BEAM

TECHNICAL FIELD

The present invention relates generally to vehicle occupant protection and more particularly relates to an intrusion beam for a vehicle door.

BACKGROUND OF THE INVENTION

BACKGROUND ART

In considering the safety of passengers in automotive vehicles, modern automotive vehicles are designed to resist side impacts, especially at the door areas. Conventional vehicle doors are typically equipped with a rigid intrusion beam structure or other types of framing to protect vehicle occupants from injuries resulting from side impacts. This practice has generally proven successful in meeting side impact Federal Motor Vehicle Safety Standards (FMVSS).

In FIGS. 1 and 2 of the drawings a conventionally fabricated door assembly 2 is illustrated to include an outer panel 3 and an inner panel 4 which cooperate to form a cavity 5 into which an intrusion beam 6 is disposed. Arrangements such as this tend to consume a relatively large amount of space, thereby limiting the ability of the vehicle designers to package other components, such as the window pane and window regulators, into the cavity 5 vehicle door 2.

Accordingly, there remains a need in the art for a vehicle door assembly having an intrusion beam which does not consume space within the interior of the door assembly to thereby improve the ability with which other components are packaged into the door assembly.

SUMMARY OF THE INVENTION

In one preferred form, the present invention provides a door assembly for a vehicle. The door assembly includes a frame structure and an intrusion structure. The frame structure includes an inner panel member and an outer panel member. The intrusion structure has an impact absorbing portion and is coupled to the frame structure such that the intrusion structure abuts an exterior surface of the outer panel member. A method for fabricating a vehicle door assembly is also provided.

BRIEF DESCRIPTION OF THE DRAWINGS

Additional advantages and features of the present invention will become apparent from the subsequent description and the appended claims, taken in conjunction with the accompanying drawings, wherein:

FIG. 3 is an exploded perspective view of a portion of a door assembly constructed in accordance with the teachings of the present invention;

FIG. 4A is a cross-sectional view taken along the line 4A—4A of FIG. 3;

FIG. 4B is a cross-sectional view similar to that of FIG. 4A but illustrating an alternate method for coupling the intrusion structure to the frame structure;

FIG. 4C is a cross-sectional view similar to that of FIG. 4A but illustrating a second alternate method for coupling the intrusion structure to the frame structure; and FIG. 5 is a cross-sectional view taken along the line 5—5 of FIG. 3.

DETAILED DESCRIPTION OF THE PREFERRED EMBODIMENT

Figure 1:
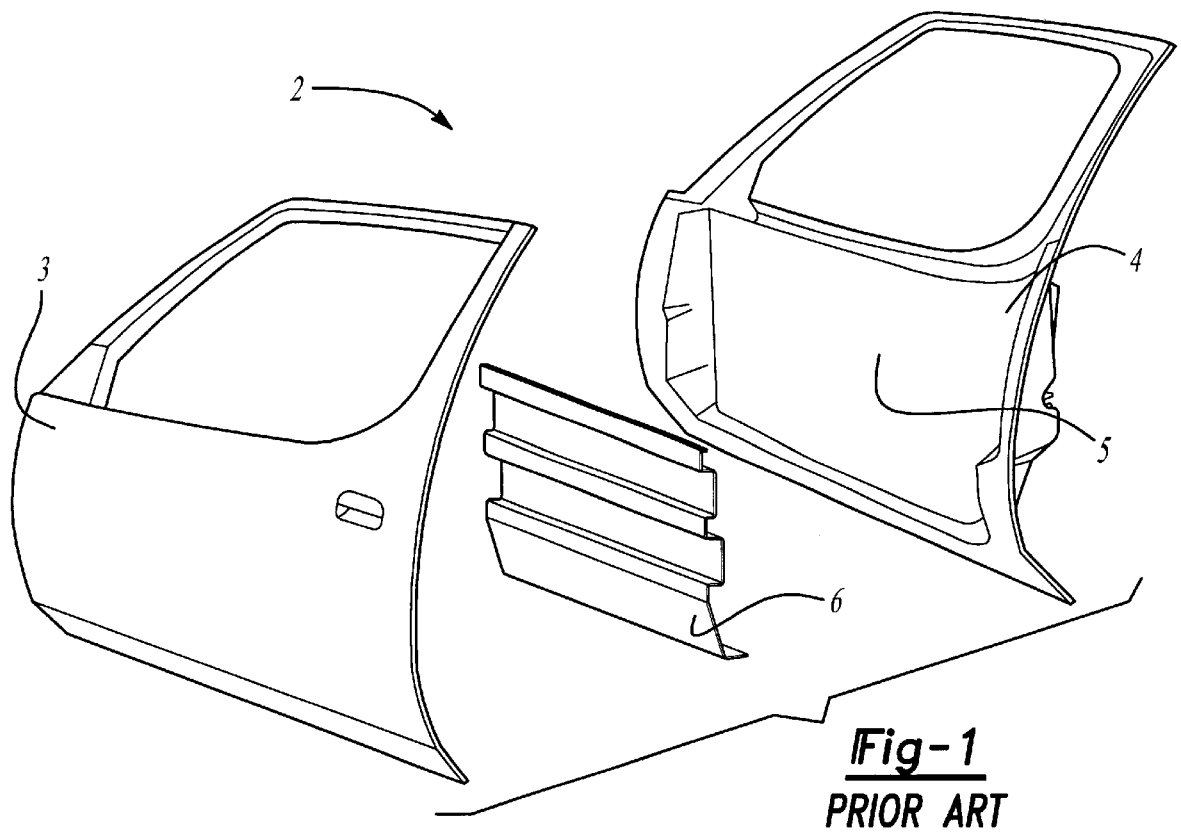
FIG. 1 is an exploded perspective view of a portion of a prior art door assembly.
Figure 2:
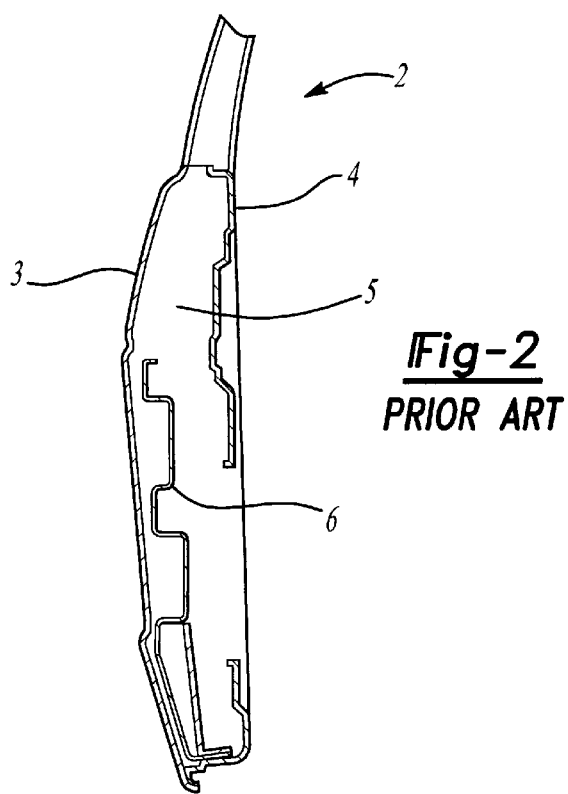
FIG. 2 is a cross-sectional view of the door assembly of FIG. 1.

With reference to FIG. 3 of the drawings, a door assembly constructed in accordance with the teachings of a preferred embodiment of the present invention is generally indicated by reference numeral 20. Door assembly 20 is shown in operative association with the vehicle body 22 of a vehicle 24. Although door assembly 20 is illustrated to be a door which is pivotably coupled to a vehicle body, those skilled in the art will understand that the teachings of the present invention have broader applicability to door assemblies and as such, the scope of the present invention will extend to all door assemblies which are movably mounted to a vehicle body.

Door assembly 20 is illustrated to include a frame structure 30, an intrusion structure 32 and a coupling mechanism 34. Frame structure 30 includes an inner panel 40 and an outer panel 42, both of which are formed from sheet steel in a stamping operation and subsequently fastened together by a conventional fastening process, such as welding. In the particular example provided, inner panel 40 includes a lower portion 44 and a window frame portion 46 having a plurality of frame members 48 which cooperate with the lower portion 44 to define a window aperture 50. Lower portion 44 includes a recessed cavity 52 for receiving conventional hardware (not shown) that is typically integrated into vehicle door assemblies such as a window regulator, a windowpane and a latch mechanism.

Similarly, outer panel 42 includes a lower portion 54 and a window frame portion 56. Lower portion 54 cooperates with lower portion 44 to substantially close recessed cavity 52 to conceal and protect the conventional hardware that is mounted therein. Window frame portion 56 similarly cooperates with window frame portion 46 to provide a window frame 58 which conventionally houses the windowpane (not shown). A recessed slot 60 which is formed along an axis generally parallel the longitudinal axis of vehicle 24 is formed into the exterior surface 61 of outer panel 42. Recessed slot 60 includes an end wall 62 and a pair of side walls 64 which taper inwardly and rearwardly toward end wall 62. Recessed slot 60 will be discussed in additional detail, below.

In the particular embodiment illustrated, intrusion structure 32 is shown to include a plurality formed beam member 70, a trim cap 72 and a pair of end caps 74. With additional reference to FIGS. 4A and 5, beam member 70 is illustrated to be an extruded component having an impact absorbing portion 76 with a generally hollow interior 78 and a pair of open ends 80. Impact absorbing portion 76 is configured to absorb the force of an impact by deforming. A plurality of fastener apertures 82 which are sized to cooperate with coupling mechanism 34 are formed into beam member 70.

In the particular embodiment illustrated, coupling mechanism 34 is illustrated to include a plurality of nuts 90 for threadably engaging a plurality of studs 92 which are positioned proximate a hinge reinforcement area 94 and a latch reinforcement area 96 and fixedly coupled to the exterior surface 61 of frame structure 30 within the recessed cavity 52. Construction of door assembly 20 in this manner permits the heavily reinforced portions of frame structure 30 to support intrusion structure 32 to thereby minimize the need for other reinforcements that would add weight and cost to the door assembly 20. Those skilled in the art will understand that frame structure 30 may be fabricated with additional and/or alternative reinforcement areas for use in coupling intrusion structure 32 to frame structure 30. Furthermore, those skilled in the art will also understand that coupling mechanism 30 may alternatively or additionally employ other types of mechanical fasteners (e.g., rivets, screws), adhesives (e.g., Beta Mat 73313 2-part epoxy adhesive) and welding (e.g., spot welding, resistance welding).

In coupling intrusion structure 32 to frame structure 30, beam member 70 is initially positioned over studs 92 and pushed into recessed slot 60. The tapering side walls 64 of recessed slot 60 cooperate with the tapering walls 100 of beam member 70 and operatively locate the beam member 70 relative to frame structure 30. Nuts 90 are threadably engaged to each of the studs 92 and tightened to produce a clamping force which fixedly but removably secures beam member 70 to frame structure 30.

Trim cap 72 is next coupled to the exterior face 102 of beam member 70. Trim cap 72 is preferably molded from a resilient material which may be painted, plated or otherwise colored to match the color or accent the appearance of vehicle 24. Trim cap 72 includes a longitudinally extending body portion 110 and a pair of end structures 112. Body portion 110 is arcuately contoured, with each of its upper and lower edges 114 and 116, respectively, terminating at a coupling tab 118 which is configured to deform slightly and frictionally engage a corresponding tab 120 that is formed into beam member 70. Each of the end structures 112 is configured to wrap over an associated one of the ends 80 of beam member 70 to thereby conceal the appearance of the longitudinally extending channel 124 that is formed into the exterior face 102 of beam member 70. Optionally, a bead of sealant 128 may be applied to frame structure 30, beam member 70 and/or trim cap 72 at various positions to inhibit the infiltration of water and debris into beam member 70 and/or between beam member 70 and outer panel 42.

End caps 74 are also preferably molded from a resilient material and are sized to engage and substantially close an associated one of the open ends 80 of beam member 70. In the particular embodiment illustrated, each of the end caps 74 includes a flange portion 130 and a core portion 132. Flange portion 130 is sized to abut and conceal the end 80 of beam member 70. Since the end structures 112 of trim cap 72 wrap over the end 80 of beam member 70, a gap (not specifically shown) between the end 80 of beam member 70 and flange portion 130 does not reveal the hollow interior 78 of beam member 70. Core portion 132 is fixedly coupled to flange portion and is sized to frictionally and sealingly engage the interior perimeter 136 of the beam member 70 to thereby secure end cap 74 to beam member 70. Depending on the resiliency of the material from which end cap 74 is molded, as well as the amount of frictional engagement desired, core portion 132 may include one or more cavities 138 to improve the flexibility of core portion 132.

In fabricating door assembly 20, inner panel 40 and outer panel 42 are initially fastened together to form frame structure 30. Frame structure 30 is then finished in a conventional finishing process, such as electrodeposition painting, to apply the final finish to frame structure 30. Frame structure 30 is next subassembled with conventional door hardware (not shown) and intrusion structure 32 is then coupled to frame structure 30. Construction of door assembly 20 in this manner is highly advantageous in that in the event that door assembly 20 is impacted by another object, the impact absorbing portion 76 of the intrusion structure 32 is positioned to contact the object immediately to thereby reduce the degree of intrusion into the door assembly 20. Construction of door assembly 20 in this manner also provides more space in recessed cavity 52 for mounting conventional hardware as well as reduces the number of components in the door assembly 20 by utilizing the intrusion structure to trim the door assembly 20.

While the intrusion structure 32 and coupling mechanism 34 have been described in the specification and illustrated in the drawings with reference to a preferred embodiment, it will be understood by those skilled in the art that various changes may be made and equivalents may be substituted for elements thereof without departing from the scope of the invention. For example, intrusion structure 32a and coupling mechanism 34a may be constructed as shown in FIG. 4B.

In this arrangement, intrusion structure 32a includes a beam member 70a and end caps 74. Beam member 70a is formed, for example, from a sheet steel material, such as carbon steel or preferably stainless steel, via rolling or stamping to provide a structure a generally C-shaped cross-section. Beam member 70a may be painted, anodized or plated (e.g., chrome plated) to improve or alter the aesthetic characteristics of intrusion structure 32a.

Coupling mechanism 34a is shown to include a pin member 150 and a collar 152. Pin member 150 is fixedly coupled to the interior perimeter 136a of the hollow interior 78a of beam member 70a. Collar 152 includes a head portion 156 which is fixedly coupled to a coupling portion 158. Coupling portion 158 extends through an aperture 160 in outer panel 42a and frictionally engages pin member 150 to fixedly secure beam member 70a to frame structure 30a. Optionally, an adhesive material 166 and additionally or alternatively be employed to retain intrusion structure 32a to frame structure 30a.

Alternatively, intrusion structure 32b and coupling mechanism 34b may be constructed as shown in FIG. 4C. In this arrangement, intrusion structure 32b includes a beam member 70b and end caps 74. Beam member 70b is also formed, for example, from a sheet steel material, such as carbon steel or preferably stainless steel, via rolling or stamping to provide a structure a generally C-shaped cross-section. Beam member 70b includes a plurality of hook-like spring clips 170 which are operable for engaging clip apertures 172 formed into frame structure 30b. Engagement of spring clips 170 into clip apertures 172 causes spring clips 170 to produce a force which is exerted against frame structure 30b to retain beam member 70b against the end wall 62b of recessed slot 60b.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A door assembly for a vehicle having a vehicle body, the door assembly comprising:

a frame structure having an inner panel member and an outer panel member;

an intrusion structure having an impact absorbing portion, the intrusion structure abutting an exterior surface of the outer panel member; and coupling means for coupling the intrusion structure to the frame structure.

2. The door assembly of claim 1, wherein the intrusion structure includes an elongated beam member.

3. The door assembly of claim 2, wherein the intrusion structure further includes a trim cap coupled to an exterior surface of the elongated beam member.

4. The door assembly of claim 3, wherein at least a portion of the trim cap is formed from a resilient material.

5. The door assembly of claim 2, wherein the elongated beam member has a generally hollow cross-section.

6. The door assembly of claim 5, wherein the intrusion structure further includes at least one end cap that is sized to engage and substantially close an associated open end of the elongated beam member.

7. The door assembly of claim 2, wherein the elongated beam member is unitarily formed.

8. The door assembly of claim 2, wherein the outer panel includes a recessed slot configured to locate the elongated beam member relative to the frame structure.

9. The door assembly of claim 1, wherein the coupling means includes a plurality of threaded fasteners.

10. The door assembly of claim 1, wherein the coupling means includes a plurality of spring clips.

11. The door assembly of claim 10, wherein the plurality of spring clips are formed into the intrusion structure and engage a plurality of clip apertures formed into the frame structure.

12. The door assembly of claim 1, wherein the frame structure includes a hinge reinforcement area and a latch reinforcement area, the coupling means fixedly coupling the intrusion structure at a first end to one of the hinge reinforcement and latch reinforcement areas.

13. The door assembly of claim 12, wherein the coupling means fixedly couples a second end of the intrusion structure to the other one of the hinge reinforcement and latch reinforcement areas.

14. A method for fabricating a vehicle door assembly, the method comprising the steps of:

providing an inner door panel and an outer door panel;

coupling the inner door panel and the outer door panel to form a frame structure;

applying a finish to an exterior surface of the frame structure; and securing an intrusion structure to the inner door panel and the outer door panel.

15. The method of claim 14, wherein the step of securing the intrusion structure to the finished exterior surface of the frame structure includes the steps of:

locating a beam member to a recessed slot in the frame structure; and fastening the beam member to the frame structure while the beam member is positioned in the recessed slot.

16. The method of claim 15, wherein after the step of fastening the beam member to the frame structure the method includes the step of securing at least one trim component to the beam member.

17. The method of claim 16, wherein the at least one trim component is selected from a group of trim components consisting of a trim cap and an end cap.

18. An automotive vehicle comprising:

a vehicle body defining a door aperture; and a door assembly movably coupled to the vehicle body and movable between a closed position that substantially closes the door aperture and an open position that substantially clears the door aperture, the door assembly having a frame structure and an intrusion structure, the frame structure including an inner panel member and an outer panel member, the intrusion structure including an impact absorbing portion, the intrusion structure abutting an exterior surface of the outer panel member and being fixedly coupled to the inner panel member and the outer panel member.

19. The vehicle of claim 18, wherein the vehicle door is pivotably coupled to the vehicle body.

20. The vehicle of claim 18, wherein the intrusion structure includes a beam member and at least one trim component.

21. The vehicle of claim 20, wherein the at least one trim component is selected from a group of trim components consisting of a trim cap and an end cap.

22. The vehicle of claim 21, wherein the outer panel includes a recessed slot for locating the beam member relative to the frame structure.

* * * * *